(12) United States Patent
Hattori et al.

(10) Patent No.: US 7,090,786 B2
(45) Date of Patent: Aug. 15, 2006

(54) AQUEOUS DISPERSION FOR CHEMICAL/MECHANICAL POLISHING

(75) Inventors: Masayuki Hattori, Tokyo (JP); Nobuo Kawahashi, Tokyo (JP)

(73) Assignee: JSR Corporation, Tokyo (JP)

( * ) Notice: Subject to any disclaimer, the term of this patent is extended or adjusted under 35 U.S.C. 154(b) by 137 days.

(21) Appl. No.: 10/878,052

(22) Filed: Jun. 29, 2004

(65) Prior Publication Data

US 2005/0001199 A1    Jan. 6, 2005

(30) Foreign Application Priority Data

Jul. 1, 2003    (JP) .............................. 2003-270113

(51) Int. Cl.
*C09K 13/06*    (2006.01)
(52) U.S. Cl. ..................... 252/79.4; 438/692; 438/693; 438/700; 216/89; 216/90; 216/103; 451/36
(58) Field of Classification Search ................ 438/692, 438/693; 216/89, 90, 99; 451/36, 41, 60; 510/165, 167; 252/79.1
See application file for complete search history.

(56) References Cited

U.S. PATENT DOCUMENTS

| | | | | |
|---|---|---|---|---|
| 3,592,893 A | * | 7/1971 | Nosler et al. | ................ 514/642 |
| 6,258,140 B1 | * | 7/2001 | Shemo et al. | ................. 51/308 |
| 2002/0045350 A1 | | 4/2002 | Kido et al. | |

FOREIGN PATENT DOCUMENTS

JP    3-197575    8/1991

OTHER PUBLICATIONS

S. Wolf, Silicon Processing for the VLSI Era, vol. 4, (2002), Lattice Press, pp. 446-448.*

* cited by examiner

*Primary Examiner*—Nadine G. Norton
*Assistant Examiner*—Maki Angadi
(74) *Attorney, Agent, or Firm*—Oblon, Spivak, McClelland, Maier & Neustadt, P.C.

(57) ABSTRACT

The aqueous dispersion comprising (A) abrasive grains, (B) at least one compound selected from the group consisting of 2-bromo-2-nitro-1,3-propanediol, 2-bromo-2-nitro-1, 3-butanediol, 2,2-dibromo-2-nitroethanol, and 2,2-dibromo-3-nitrilopropionamide, and (C) an organic component other than the compounds of component (B) is disclosed. The aqueous dispersion has no problem of rotting even if stored or used in a neutral pH region and produces an excellent polished surface with almost no dishing or scratches, when applied particularly to the STI process for manufacturing of semiconductor devices.

9 Claims, 1 Drawing Sheet

AQUEOUS DISPERSION FOR CHEMICAL/MECHANICAL POLISHING

BACKGROUND OF THE INVENTION

1. Field of the Invention

The present invention relates to an aqueous dispersion for chemical/mechanical polishing.

2. Description of Background Art

The storage capacity of memory devices has remarkably increased with the increase in the degree of integration, multilayer wiring, and the like of semiconductor devices. This is supported by the progress in microfabrication technologies. However, there are problems such as an increased chip size in spite of using multilayer wiring and the like and an increased cost for production of chips because of an increased number of production steps due to the progress in microfabrication technologies. In this situation, a chemical/mechanical polishing technology has been introduced into the polishing step of processed films and the like in manufacturing semiconductor devices. The technology has attracted attention. Many microfabrication technologies such as flattening have been put into practice by applying the chemical/mechanical polishing technology.

A shallow trench isolation (STI) technology is known as such a microfabrication technology, for example (see Japanese Patent Application Laid-open No. 8-22970, for example). Various aqueous dispersions for chemical/mechanical polishing used for the microfabrication technology have been proposed. To improve polishing performance of such aqueous dispersions, organic additives are frequently added. The organic additives, however, easily rot the aqueous dispersions. To avoid this problem, a component that can make the aqueous dispersion strongly acidic or strongly alkaline, or can suppress rotting of the aqueous dispersions is added. Japanese Patent Application Laid-open No. 2002-45681, for example, discloses a method of adding hydrogen peroxide and the like to suppress the rotting. Japanese Patent Application Laid-open No. 3-197575 discloses a method of adding tetraalkylammonium chloride, tetraalkylammonium hydroxide, or the like to an aqueous dispersion containing colloidal silica as a bactericidal agent.

However, since aqueous dispersions for chemical/mechanical polishing containing ceria particles which are frequently employed in the STI technology are usually used in a neutral pH region, there is a limitation to suppression of rotting by adjusting pH. In addition, since the effect of hydrogen peroxide as an antiseptic agent does not last long, rotting may begin in an aqueous dispersion feeding device in the continuous use for about one week. If a conventionally known antiseptic agent is added to such an aqueous dispersion, the polished surface may be damaged by scratches and dishing, even if an antiseptic effect is exhibited.

The present invention has been completed to solve the above problem and has an object of providing an aqueous dispersion for chemical/mechanical polishing which does not rot even if used in a neutral pH region, produces almost no damages such as scratches and dishing on the polished surface, and can sufficiently flatten the surface.

SUMMARY OF THE INVENTION

The above object of the present invention can be achieved by an aqueous dispersion for chemical/mechanical polishing comprising: (A) abrasive grains, (B) at least one compound selected from the group consisting of 2-bromo-2-nitro-1,3-propanediol, 2-bromo-2-nitro-1,3-butanediol, 2,2-dibromo-2-nitroethanol, and 2,2-dibromo-3-nitrilopropionamide, and (C) an organic component other than the compounds of component (B).

In a preferred embodiment of the present invention, the abrasive grains (A) are ceria particles.

In another preferred embodiment of the present invention, the organic component (C) comprises a water-soluble polymer.

The aqueous dispersion for chemical/mechanical polishing of the present invention is preferably used for a shallow trench isolation process.

Other and further objects, features and advantages of the present invention will appear more fully from the following description.

DETAILED DESCRIPTION OF THE INVENTION AND PREFERRED EMBODIMENTS

Figure 1:
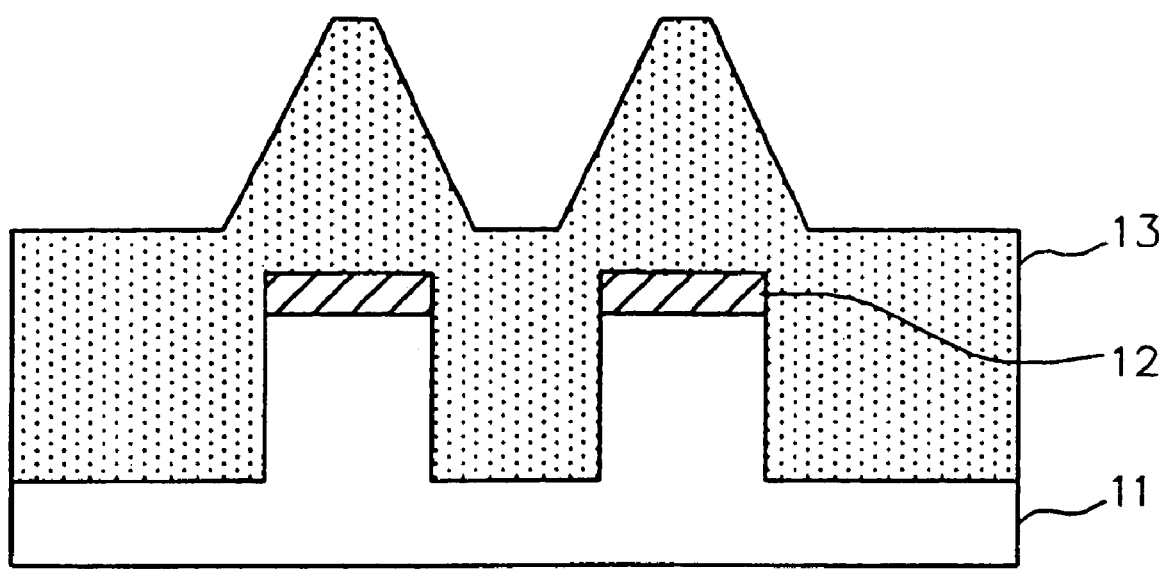
FIG. 1 is a cross-sectional view illustrating an embodiment of the object to be polished in the present invention.

The components for the aqueous dispersion for chemical/mechanical polishing of the present invention will now be described in detail.

(A) Abrasive Grains

As the abrasive grains (A) used in the present invention, at least one type selected from the group consisting of inorganic particles, organic particles, and organic-inorganic composite particles can be mentioned. As examples of the inorganic particles, ceria particles, silica particles, alumina particles, zirconia particles, and titania particles can be given.

As examples of the organic particles, particles of thermoplastic resins such as polyvinyl chloride, polystyrene, styrene copolymers, polyacetal, saturated polyesters, polyamide, polycarbonate, polyolefins such as polyethylene, polypropylene, poly-1-butene, and poly-4-methyl-1-pentene, olefin copolymers, phenoxy resins, poly(meth)acrylic acids such as polymethyl methacrylate, poly(meth)acrylate, (meth) acrylic acid copolymers, and (meth) acrylate copolymers; and heat-curable resins such as phenol resins, urea resins, melamine resins, epoxy resins, alkyd resins, and unsaturated polyester resins can be given.

As the organic-inorganic composite particles, composite particles consisting of at least one type of the above-mentioned inorganic particles and at least one type of the above-mentioned organic particles bonded together can be given. The term "bonded" herein refers to a concept including the electrostatic bond in addition to the chemical bond.

Although there are no specific limitations to the average particle diameter of the abrasive grains (A) that can be added to the aqueous dispersion of the present invention, abrasive grains having an average particle diameter in the range of 0.01–3 μm are preferable. If abrasive grains having an average particle diameter in the above range are used, an aqueous dispersion stable and exhibiting a high polishing speed, with controlled precipitation of the abrasive grains in the aqueous dispersion, can be obtained. The average particle diameter of the abrasive grains is preferably in the range of 0.02–1.5 μm, more preferably 0.03–1 μm, and particularly preferably 0.04–0.5 μm.

The average particle diameter of the abrasive grains can be measured using a dynamic light scattering measuring instrument, a laser scattering diffraction measuring instrument, and the like. Inspection using a transmission electron microscope can also measure the average particle diameter. It is also possible to measure the specific surface area of dry powder of the abrasive grains and calculate the average particle diameter from the specific surface area.

The amount of the abrasive grains (A) that can be added to the aqueous dispersion of the present invention is preferably 0.1–15 wt %, more preferably 0.2–10 wt %, and particularly preferably 0.3–6 wt %, for 100 wt % of the total of the aqueous dispersion. The amount of 0.4–3 wt % is optimum. If the amount of the abrasive grains is less than 0.1 wt %, the aqueous dispersion may not exhibit a sufficient polishing speed; if more than 15 wt %, the abrasive grains easily produce a precipitate which can be re-dispersed only with difficulty.

Abrasive grains containing inorganic particles, particularly ceria particles, are preferable for use in the aqueous dispersion of the present invention.

As the ceria particles, particles obtained by treating powders of cerium carbonate, cerium hydroxide, cerium oxalate, and the like with heat in an oxidation atmosphere can be mentioned. Of these, ceria particles obtained from cerium carbonate are particularly preferable.

When ceria particles are used as the abrasive grains (A) in the aqueous dispersion of the present invention, a part of the ceria particles may be replaced with another type of abrasive grains. The proportion of the other type of particles is preferably 70 wt % or less, and more preferably 50 wt % or less of the total amount of the ceria particles and the other type of particles.

When the other type of abrasive grains are used together with the ceria particles, such other type of abrasive grains preferably have about the same average particle diameter.

(B) At Least one Compound Selected from the Group Consisting of 2-bromo-2-nitro-1,3-propanediol, 2-bromo-2-nitro-1,3-butanediol, 2,2-dibromo-2-nitroethanol, and 2,2-dibromo-3-nitrilopropionamide At least one compound selected from the group consisting of 2-bromo-2-nitro-1,3-propanediol, 2-bromo-2-nitro-1,3-butanediol, 2,2-dibromo-2-nitroethanol, and 2,2-dibromo-3-nitrilopropionamide is added to the aqueous dispersion for chemical/mechanical polishing of the present invention. Among these compounds, 2-bromo-2-nitro-1,3-propanediol is particularly preferable from the viewpoint of the balance between the antiseptic capability and the polished surface conditions.

The amount of at least one compound selected from the group consisting of 2-bromo-2-nitro-1,3-propanediol, 2-bromo-2-nitro-1,3-butanediol, 2,2-dibromo-2-nitroethanol, and 2,2-dibromo-3-nitrilopropionamide added to the aqueous dispersion for chemical/mechanical polishing of the present invention is preferably 0.0002–0.2 wt %, more preferably 0.001–0.17 wt %, and particularly preferably 0.002–0.15 wt %, for 100 wt % of the total of the aqueous dispersion. The amount of 0.003–0.12 wt % is optimum. The addition of the compound in an amount in this range ensures excellent balance between the antiseptic capability and the polishing performance of the aqueous dispersion.

(C) Organic Component Other than the Component (B)

The organic component (C) added to the aqueous dispersion for chemical/mechanical polishing of the present invention is at least one compound selected from the group consisting of water-soluble polymers, surfactants, and organic acids other than the components (B).

As examples of the above-mentioned water-soluble polymers, polyacrylic acid, polymethacrylic acid, polyacrylamide, polystyrenesulfonic acid, sulfonated polyisoprene, polyvinyl alcohol, polyvinyl pyrrolidone, copolymers formed from two or more monomers forming these polymers, and cellulose derivatives such as carboxymethylcellulose, hydroxyethylcellulose, hydroxypropylcellulose, methylcellulose, ethylcellulose, and ethylhydroxyethylcellulose can be given.

Of these, polyacrylic acid and polymethacrylic acid are preferable.

These water-soluble polymers may be in the form of salt in which a part or all of the carboxyl groups, sulfonic acid groups, or hydroxyl groups forms at least one salt selected from the group consisting of ammonium salt, alkyl ammonium salt, and potassium salt.

The concentration of the counter ions forming the above-mentioned salt such as an ammonium ion, an alkyl ammonium ion, or a potassium ion is preferably 50–90 mols, and more preferably 60–80 mols for 100 mols of the carboxyl groups, sulfonic acid groups, or hydroxyl groups contained in the water-soluble dispersion.

The polyethylene glycol-reduced weight average molecular weight of the water-soluble polymer determined by gel permeation chromatography (solvent: water, hereinafter referred to as "aqueous GPC") is preferably 3,000–30,000, more preferably 4,000–20,000, and particularly preferably 5,000–12,000.

When the water-soluble polymer is used as the organic component for the component (C) other than the above-mentioned component (B) in the aqueous dispersion for chemical/mechanical polishing of the present invention, the amount of the water-soluble polymer is preferably 0.1–15 wt %, and more preferably 1–8 wt % for 100 wt % of the total amount of the aqueous dispersion.

As the above-mentioned surfactant, any one of cationic, anionic, amphoteric, and nonionic surfactants can be used.

As examples of the anionic surfactant, fatty acid soap; carboxylates such as alkyl ether carboxylate; sulfonates such as alkylbenzenesulfonate, alkylnaphthalenesulfonate, and α-olefin sulfonate; sulfates such as higher alcohol sulfate, alkyl ether sulfate, and polyoxyethylene alkyl phenyl ether sulfate; and phosphates such as alkyl phosphate can be given.

As the salt, ammonium salt, potassium salt, sodium salt, and the like can be given, with the ammonium salt and potassium salt being particularly preferable.

Among the above-mentioned surfactants, sulfonates are preferable, with particularly preferable sulfonates being potassium dodecylbenzenesulfonate and/or ammonium dodecylbenzenesulfonate.

As the cationic surfactant, lauryltrimethylammonium chloride, stearyltrimethylammonium chloride, cetyltrimethylammonium chloride, stearyltrimethylammonium chloride, distearyldimethylammonium chloride, dialkyldimethylammonium chloride, alkyl imidazoline, benzalkonium chloride solution, and the like can be given. As the alkyl group contained in the above-mentioned dialkyldimethylammonium chloride, alkyl groups having 12–18 carbon atoms are preferable.

As the amphoteric surfactant, betaine lauryldimethylaminoacetate, betaine stearyldimethylaminoacetate, 2-alkyl-N-carboxymethyl-N-hydroxyethyl imidazoliniumbetaine, lauryl amidopropyl betaine, cocamidopropyl betaine, lauryl hydroxy sulfobetaine, lauryl dimethylamine oxide, and the like can be given.

As the nonionic surfactant, polyoxyethylene alkylamine, alkylalkanolamides such as palm kernel oil fatty acid diethanolamide and lauric acid diethanolamide, an ethylene oxide addition product of acetylene glycol, and the like can be given.

When a surfactant is used as the organic component for the component (C) other than the above-mentioned component (B) in the aqueous dispersion for chemical/mechanical polishing of the present invention, the amount of the surfactant is preferably 0.01–5 wt %, and more preferably 0.05–2 wt % for 100 wt % of the total amount of the aqueous dispersion.

As examples of the organic acid, p-toluenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid, phthalic acid; and amino acids such as glycine, alanine, glutamic acid, and tryptophan; as well as salts of these acids such as ammonium salt and potassium salt can be given. As the salt, ammonium salt is preferable.

When an organic acid is used as the organic component for the component (C) other than the above-mentioned component (B) in the aqueous dispersion for chemical/mechanical polishing of the present invention, the amount of the organic acid is preferably 0.1–10 wt %, and more preferably 0.5–5 wt % for 100 wt % of the total amount of the aqueous dispersion.

The amount of the organic components for the component (C) other than the above-mentioned component (B) to be added to the aqueous dispersion for chemical/mechanical polishing of the present invention, in terms of the total amount of the water-soluble polymer, surfactant, and organic acid, is preferably 0.1–15 wt %, and more preferably 0.5–8 wt %.

Optional Components

As required, other components may be added to the aqueous dispersion to the extent not adversely affecting the antiseptic properties. As such other components, oxidizers such as hydrogen peroxide, persulfate, and heteropolyacid; ions of a polyvalent metal such as aluminum, titanium, vanadium, chromium, and iron; and the like can be given.

The aqueous dispersion for chemical/mechanical polishing of the present invention can be prepared by adding the above-mentioned components (A) to (C) and the above-mentioned optional components to an aqueous medium and, as required, by adjusting the pH.

As the aqueous medium, either water or a mixed medium containing water as a main component such as a mixture of water and methanol or the like can be used. Using water alone as the aqueous medium is particularly preferable.

The aqueous dispersion for chemical/mechanical polishing of the present invention does not cause the problem of rotting, even if adjusted to a near neutral pH, for example, 4–10, particularly 6–9. In addition to the above-mentioned organic acids, an inorganic acid, organic base, and inorganic base can be used for adjusting the pH of the aqueous dispersion for chemical/mechanical polishing of the present invention.

As examples of the inorganic acid, nitric acid, hydrochloric acid, and sulfuric acid can be given. As the organic base, ethylenediamine, ethanolamine, and the like can be given. As examples of the inorganic base, ammonia, potassium hydroxide, sodium hydroxide, and lithium hydroxide can be given.

In preparing the aqueous dispersion, it has conventionally been necessary to blend the components with water immediately before use to avoid the problem of rotting. For this reason, a conventional aqueous dispersion has problems such as requirement for a complicated supply system, inconsistent compositions, and the like.

On the other hand, the aqueous dispersion for chemical/mechanical polishing of the present invention with outstanding antiseptic properties has no problem of rotting. For this reason, it is possible to previously prepare an aqueous dispersion composition with a high concentration and dilute it with an aqueous medium when using the aqueous dispersion. Therefore, the aqueous dispersion of the present invention has an advantage of providing a consistent composition without requiring a complicated supply system.

In the chemical/mechanical polishing process using the aqueous dispersion of the present invention, the aqueous dispersion containing the components (A) to (C) in the above-mentioned recommended amounts is used for polishing. When preparing the aqueous dispersion of the present invention, either a method of blending the components in the amounts corresponding to the composition required for the polishing or a method of previously preparing a composition with a higher concentration and diluting the composition with water or the like when used for polishing.

To prepare the composition with a higher concentration, the proportion of the components should be the same as the recommended proportion upon use for polishing. With regard to the amount of each component in the composition with a higher concentration, the abrasive grains of the component (A) are preferably 20 wt % or less, and more preferably 15 wt %, the component (B) is preferably 15 wt % or less, and more preferably 12 wt % or less, and the component (C) is preferably 30 wt % or less.

In either the case of preparing the aqueous dispersion by blending the components in the same amounts required for the composition when used for polishing or the case of preparing a concentrated aqueous dispersion with the concentration of each component in the above-mentioned range, the aqueous dispersion of present invention does not become rotted after storing for a long period of time and can exhibit the target polishing performance without causing a problem of rotting during use when used for a chemical/mechanical polishing process by dilution as required.

The aqueous dispersion for chemical/mechanical polishing of the present invention can be suitably used particularly in the shallow trench isolation process in the manufacture of semiconductor devices and exhibits excellent surface flattening performance with minimal over-polishing of the insulating film (dishing) and little production of scratches (damages on the insulator material surface after polishing).

As an example of the surface to be polished in the shallow trench isolation process, an object to be polished having a cross-sectional structure as shown in FIG. 1 can be given. The object comprises a substrate 11 formed from silicon or the like and having convexities and concavities, a stopper layer 12 formed on the convexities of the substrate 11 from silicon nitride or the like, and an embedded insulating layer 13 formed from an insulating material to cover the concavities of the substrate 11 and the stopper layer 12.

As the material forming the above-mentioned embedded insulating layer 13, silicon oxide ($SiO_2$), a boron phosphorous silicate glass (BPSG) film produced by adding a small amount of boron and phosphorus to silicon oxide, an insulating film called FSG (Fluorine doped Silicate Glass) formed by doping silicon oxide with fluorine, a silicon oxide-containing insulating film with a low dielectric constant, and the like can be given.

As types of silicon oxide, a thermally oxidized film, PETEOS film (Plasma Enhanced-TEOS film), HDP film (High Density Plasma Enhanced-TEOS film), silicon oxide film obtained by a thermal CVD method, and the like can be given. Of these, the PETEOS film, HDP film, and silicon oxide film obtained by a thermal CVD method are preferable.

The thermally oxidized film can be formed by exposing silicon heated to a high temperature to an oxidizing atmosphere to cause the silicon to chemically react with oxygen or water.

The PETEOS film can be formed by a chemical vapor phase growth method from tetraethyl orthosilicate (TEOS) as a raw material under accelerating conditions using plasma.

The HDP film can be formed by a chemical vapor phase growth method from tetraethyl orthosilicate (TEOS) as a raw material under accelerating conditions using high density plasma.

The silicon oxide film obtained by a thermal CVD method can be prepared either by an atmospheric CVD method (AP-CVD method) or by a low pressure CVD method (LP-CVD method).

The boron phosphorous silicate glass (BPSG) film can be prepared either by an atmospheric CVD method (AP-CVD method) or by a low pressure CVD method (LP-CVD method).

The insulating film called FSG (Fluorine doped Silicate Glass) can be formed by a chemical vapor phase growth method under accelerating conditions using high density plasma.

The above-mentioned silicon oxide-containing insulating film with a low dielectric constant can be obtained by applying the raw material onto a substrate by a roll coating method and heating in an oxidizing atmosphere. As examples of the silicon oxide-containing insulating film with a low dielectric constant obtained in this manner, an HSQ film (Hydrogen Silsesquioxane film) and MSQ film (Methyl Silsesquioxane film) containing methyltrimethoxysilane in addition to tetraethoxysilane as a part of the raw material can be given. Moreover, insulating films with a low dielectric constant prepared from an organic polymer such as a polyarylene polymer, polyarylene ether polymer, polyimide polymer, or benzocyclobutene polymer as a raw material can be given.

To polish the surface of the object to be polished by the chemical/mechanical polishing process using the aqueous dispersion for chemical/mechanical polishing of the present invention, commercially available chemical/mechanical polishing apparatuses such as EPO-112 and EPO-222 manufactured by Ebara Corp., LGP-510 and LGP-552 manufactured by Lapmaster SFT Corp., Mirra manufactured by Applied Materials, Inc., Teres manufactured by Ram Research Co., and AVANTI 472 manufactured by Speed Fam-IPEC Co., Ltd. can be used.

Any known polishing pads can be used for polishing the surface of the object to be polished by the chemical/mechanical polishing process using the aqueous dispersion for chemical/mechanical polishing of the present invention. For example, IC1000/SUBA400, IC1010, SUBA series, and Polytex series (all manufactured by Rodel Nitta Co.) can be given.

Polishing conditions appropriate to the purpose of polishing can be adopted. For example, the following conditions can be given.
Feed rate of aqueous dispersion: 100–300 mL/min
Head pressure: 200–600 g/cm$^2$
Table rotation: 50–100 rpm
Head rotation: 50–100 rpm

EXAMPLES

Preparation of Concentrate of Aqueous Dispersion for Chemical/Mechanical Polishing Preparation Example 1

(1) Preparation of Dispersion Containing Abrasive Grains (A)

35 parts by weight of ceria obtained by heating cerium carbonate in the air was put into 65 parts by weight of ion-exchanged water. The mixture was adjusted to pH 5.0 by adding nitric acid. The resulting mixture was put into a bead mill (manufactured by Ashizawa Co., Ltd.) and pulverized using zirconia beads with a diameter of 1 mm and filtered through a 5 μm filter to obtain a dispersion containing ceria particles with an average particle diameter of 0.14 μm. The particle diameter was measured using a particle diameter distribution measurement apparatus, SALD-200A, manufactured by Shimadzu Corp.

(2) Preparation of Aqueous Solution Containing Organic Component (C) Other than Component (B)

A 5 wt % KOH aqueous solution was added to an aqueous solution containing 40 wt % of polyacrylic acid with a polyethylene glycol-reduced weight average molecular weight of 6,000 measured by aqueous GPC to obtain an aqueous solution containing potassium polyacrylate with a neutralization degree of 70%.

(3) Preparation of Concentrate of Aqueous Dispersion for Chemical/Mechanical Polishing The dispersion containing ceria particles prepared in (1) above, a 5 wt % aqueous solution of 2-bromo-2-nitro-1,3-propanediol, and the aqueous solution containing polyacrylic acid prepared in (2) above were mixed at a prescribed ratio, followed by the addition of ion-exchanged water to obtain a concentrate (S-1) of aqueous dispersion for chemical/mechanical polishing which contains 10 wt % of ceria particles, 0.004 wt % of 2-bromo-2-nitro-1,3-propanediol, and 25 wt % of potassium salt of polyacrylic acid (neutralization degree=70%).

Preparation Examples 2–16, Comparative Preparation Examples 1–7

Concentrates (S-1) to (S-16) and (R-1) to (R-7) of aqueous dispersions for chemical/mechanical polishing were obtained almost in the same manner as in Preparation Example 1, using components with the types and amounts shown in Table 1.

The average particle diameter of abrasive grains was changed by adjusting the time for the grinding process using a bead mill in the preparation of the dispersion containing the abrasive grains (A) according to the above (1).

In Table 1, PAA-K indicates potassium salt of polyacrylic acid (with a polyethylene glycol-reduced weight average molecular weight of 6,000 measured by aqueous GPC) in which a part of the carboxylic groups has been neutralized with potassium ions. The degree of neutralization shown in Table 1 was changed by adjusting the amount of the 5 wt % KOH aqueous solution to be added in (2) above.

PAA-NH$_4$ indicates ammonium salt of polyacrylic acid (with a polyethylene glycol-reduced weight average molecular weight of 6,000 measured by aqueous GPC) in which a part of the carboxylic groups has been neutralized with ammonium ions. PAA-NH$_4$ was obtained by using 28 wt % ammonia water instead of the 5 wt % KOH aqueous solution in (2) above. The degree of neutralization shown in Table 1 was changed by adjusting the amount of the 28 wt % ammonia water.

Ammonium citrate was added as a 20 wt % aqueous solution.

DBS-$NH_4$ indicates ammonium dodecylbenzene-sulfonate, which was added as a 20 wt % aqueous solution.

Hydrogen peroxide was added as a 30 wt % aqueous solution.

BNP stands for 2-bromo-2-nitro-1,3-propanediol;
BNB, 2-bromo-2-nitro-1,3-butanediol;
DBNE, 2,2-dibromo-2-nitroethanol;
DBNPA, 2,2-dibromo-3-nitrilopropionamide;
TMA-CL, tetramethylammonium chloride; and
TEA-OH, tetraethylammonium hydroxide. All these compounds were added as a 5 wt % aqueous solution.

The symbol "—" in Table 1 indicates that the component was not added.

Example 1

The concentrate (S-1) of aqueous dispersion for chemical/mechanical polishing prepared in the above Preparation Example was diluted to a 20 fold with ion-exchanged water. Polishing performance and antiseptic capability of the aqueous dispersion for chemical/mechanical polishing thus prepared was evaluated as follows.

(1) Evaluation of Polishing Speed

An 8 inch thermally oxidized film wafer was used as an object to be polished for chemical/mechanical polishing using EPO-112 (a chemical/mechanical polishing apparatus manufactured by Ebara Corp.) under the following conditions to calculate the polishing speed from the thickness removed by polishing and the polishing time. The results are shown in Table 2.

Polishing pad: IC1000/SUBA400 (P) manufactured by Rodel Nitta Co.

TABLE 1

| | | (A) Abrasive grains | | (B) Component | | (C) Component | | Other components | | |
|---|---|---|---|---|---|---|---|---|---|---|
| | Con-centrate | Type | Average particle diameter (μm) | Amount (wt %) | Type | Amount (wt %) | Type | Amount (wt %) | Type | Amount (wt %) | pH |
| Preparation Example 1 | (S-1) | Ceria | 0.14 | 10 | BNP | 0.004 | PAA-K (neutralization degree = 70%) | 25 | — | — | 6.5 |
| Preparation Example 2 | (S-2) | Ceria | 0.14 | 10 | BNP | 0.02 | PAA-K (neutralization degree = 70%) | 25 | — | — | 6.5 |
| Preparation Example 3 | (S-3) | Ceria | 0.14 | 10 | BNP | 0.1 | PAA-K (neutralization degree = 65%) | 25 | — | — | 6.5 |
| Preparation Example 4 | (S-4) | Ceria | 0.14 | 10 | BNP | 0.02 | PAA-K (neutralization degree = 65%) | 25 | — | — | 6.2 |
| Preparation Example 5 | (S-5) | Ceria | 0.11 | 10 | BNP | 0.004 | PAA-$NH_4$ (neutralization degree = 65%) | 15 | — | — | 7.5 |
| Preparation Example 6 | (S-6) | Ceria | 0.11 | 10 | BNP | 0.02 | PAA-$NH_4$ (neutralization degree = 65%) | 15 | — | — | 7.5 |
| Preparation Example 7 | (S-7) | Ceria | 0.11 | 10 | BNP | 0.1 | PAA-$NH_4$ (neutralization degree = 62%) | 15 | — | — | 7.4 |
| Preparation Example 8 | (S-8) | Ceria | 0.11 | 10 | BNB | 0.02 | PAA-$NH_4$ (neutralization degree = 62%) | 15 | — | — | 7.5 |
| Preparation Example 9 | (S-9) | Ceria | 0.12 | 10 | BNP | 0.004 | Ammonium citrate | 10 | — | — | 8.5 |
| Preparation Example 10 | (S-10) | Ceria | 0.12 | 10 | BNP | 0.02 | Ammonium citrate | 10 | — | — | 8.5 |
| Preparation Example 11 | (S-11) | Ceria | 0.12 | 10 | BNP | 0.1 | Ammonium citrate | 10 | — | — | 8.5 |
| Preparation Example 12 | (S-12) | Ceria | 0.12 | 10 | DBNE | 0.02 | Ammonium citrate | 10 | — | — | 8.5 |
| Preparation Example 13 | (S-13) | Ceria | 0.14 | 5 | BNP | 0.004 | DBS-$NH_4$ | 5 | — | — | 8.3 |
| Preparation Example 14 | (S-14) | Ceria | 0.14 | 5 | BNP | 0.02 | DBS-$NH_4$ | 5 | — | — | 8.0 |
| Preparation Example 15 | (S-15) | Ceria | 0.14 | 5 | BNP | 0.1 | DBS-$NH_4$ | 5 | — | — | 7.9 |
| Preparation Example 16 | (S-16) | Ceria | 0.14 | 5 | DBNPA | 0.02 | DBS-$NH_4$ | 5 | — | — | 8.2 |
| Comparative Preparation Example 1 | (R-1) | Ceria | 0.14 | 10 | — | — | PAA-K (neutralization degree = 70%) | 25 | — | — | 8.4 |
| Comparative Preparation Example 2 | (R-2) | Ceria | 0.14 | 10 | — | — | PAA-K (neutralization degree = 70%) | 25 | Hydrogen peroxide | 0.002 | 8.5 |
| Comparative Preparation Example 3 | (R-3) | Ceria | 0.14 | 10 | — | — | PAA-K (neutralization degree = 65%) | 25 | TMA-CL | 0.1 | 8.2 |
| Comparative Preparation Example 4 | (R-4) | Ceria | 0.26 | 10 | — | — | PAA-K (neutralization degree = 65%) | 25 | TEA-OH | 0.1 | 8.8 |
| Comparative Preparation Example 5 | (R-5) | Ceria | 0.31 | 10 | — | — | PAA-$NH_4$ (neutralization degree = 65%) | 15 | — | — | 8.4 |
| Comparative Preparation Example 6 | (R-6) | Ceria | 0.31 | 10 | — | — | Ammonium citrate | 10 | — | — | 8.2 |
| Comparative Preparation Example 7 | (R-7) | Ceria | 0.14 | 5 | — | — | DBS-$NH_4$ | 5 | — | — | 8.0 |

Head pressure: 400 g/cm$^2$
Table rotation: 70 rpm
Head rotation: 70 rpm
Feed rate of aqueous dispersion for chemical/mechanical polishing: 200 mL/min
Polishing time: 3 minutes (2) Evaluation of Number of Scratches The 8 inch thermally oxidized film wafer was polished under the same conditions as in the evaluation of the polishing speed in (1) above, except that the polishing time was 2 minutes. The number of scratches was determined by inspecting the wafer surface using a dark field wafer inspection system, KLA2112 (manufactured by KLA-Tencor Corp.). The number of scratches in the entire wafer surface is shown in Table 2.

(3) Evaluation of Dishing

A patterned wafer SKW-7 (manufactured by SKW Associates, Inc., corresponding to an object to be polished in the shallow trench isolation process, line width: 250 μm, laminated insulating material film thickness: 2,000 nm, initial level difference: 900 nm) was polished under the same conditions as in the evaluation of the polishing speed in (1) above, except that the polishing time determined from the following formula was adopted. The initial level difference herein indicates the vertical level difference between the concavities and the flat area in the embedded insulating layer 13 in FIG. 1.

Polishing time (minute)=1.15×2,000 (nm)/(polishing speed calculated according to the polish speed evaluation (1) (nm/min))

Dishing at the location with a line width of 250 nm on the polished material was evaluated using a microconfiguration surface profiler P-10 (manufactured by KLA-Tencor Corp.). The results are shown in Table 2.

(4) Evaluation of Antiseptic Capability

A 5 wt % KOH aqueous solution was added to an aqueous solution containing 40 wt % of polyacrylic acid with a weight average molecular weight of 6,000 to obtain an aqueous solution containing potassium polyacrylate with a neutralization degree of 70%. The solution was diluted with non-sterilized industrial water to prepare an aqueous solution of polyacrylic acid with a concentration of 1 wt % and 7 pH.

The aqueous solution was allowed to stand at 35° C. for 28 days to obtain a rotted model aqueous solution with a 10$^3$ bacteria concentration per cubic centimeter.

The rotted model aqueous solution was mixed with the aqueous dispersion for chemical/mechanical polishing prepared from the concentrate (S-1) at a weight ratio of 1:9. The mixture was used as a test solution for measuring the number of cells after culturing at 35° C. for 7 days using a simplified microbial test kit Easicult TTC (manufactured by Orion Diagnostica Co.). The results are shown in Table 2.

Example 2–16, Comparative Example 1–7

Polishing performance and antiseptic capability were evaluated in the same manner as in Example 1, except for using the concentrates shown in Table 2 instead of the concentrate (S-1) of aqueous dispersion for chemical/mechanical polishing at dilution rates shown in Table 2. The results are shown in Table 2.

TABLE 2

|  | Concentrate | Dilution rate (fold) | Polishing speed (nm/min) | Scratches (number) | Dishing (nm) | Antiseptic capability Number of bacteria (number/cm$^3$) |
|---|---|---|---|---|---|---|
| Example 1 | (S-1) | 20 | 121 | 9 | 54 | Not detected |
| Example 2 | (S-2) | 20 | 128 | 6 | 52 | Not detected |
| Example 3 | (S-3) | 20 | 135 | 8 | 44 | Not detected |
| Example 4 | (S-4) | 18 | 158 | 5 | 53 | Not detected |
| Example 5 | (S-5) | 20 | 320 | 2 | 76 | Not detected |
| Example 6 | (S-6) | 20 | 325 | 3 | 79 | Not detected |
| Example 7 | (S-7) | 20 | 330 | 5 | 65 | Not detected |
| Example 8 | (S-8) | 15 | 320 | 10 | 87 | Not detected |
| Example 9 | (S-9) | 20 | 280 | 4 | 82 | Not detected |
| Example 10 | (S-10) | 20 | 255 | 11 | 85 | Not detected |
| Example 11 | (S-11) | 20 | 245 | 8 | 76 | Not detected |
| Example 12 | (S-12) | 15 | 256 | 6 | 76 | Not detected |
| Example 13 | (S-13) | 10 | 189 | 11 | 56 | Not detected |
| Example 14 | (S-14) | 10 | 192 | 18 | 57 | Not detected |
| Example 15 | (5-15) | 10 | 182 | 21 | 49 | Not detected |
| Example 16 | (S-16) | 10 | 155 | 11 | 48 | Not detected |
| Comparative Example 1 | (R-1) | 20 | 80 | 57 | 57 | 10$^4$ |
| Comparative Example 2 | (R-2) | 20 | 82 | 389 | 71 | 10$^3$ |
| Comparative Example 3 | (R-3) | 20 | 74 | 2250 | 360 | Not detected |
| Comparative Example 4 | (R-4) | 20 | 73 | 450 | 450 | Not detected |
| Comparative Example 5 | (R-5) | 20 | 320 | 345 | 56 | 10$^4$ |
| Comparative Example 6 | (R-6) | 20 | 210 | 98 | 70 | 10$^3$ |
| Comparative Example 7 | (R-7) | 10 | 69 | 451 | 51 | 10$^4$ |

It can be seen from Table 2 that the aqueous dispersions for chemical/mechanical polishing of Comparative Examples 1, 5, 6, and 7 to which the component (B) was not added contained $10^3$–$10^4$ bacteria/cm$^3$, indicating the inferior antiseptic capability. These aqueous dispersions also produced a large number of scratches. In addition, the aqueous dispersions of Comparative Examples 1 and 7 did not exhibit a sufficient polishing speed, showing their unsuitability as an aqueous dispersion for chemical/mechanical polishing.

Comparative Examples 2, 3, and 4 are examples of aqueous dispersions to which conventionally known antiseptic agents were added instead of the component (B). The aqueous dispersion of Comparative Example 2 contained $10^3$ bacteria/cm$^3$ in the evaluation of antiseptic capability, showing its inferior antiseptic capability. In addition, the number of scratches was larger and the polishing speed was not satisfactory. The aqueous dispersions of Comparative Examples 3 and 4 showed no problem in the evaluation of antiseptic capability. However, these aqueous dispersions had problems in the number of scratches, dishing, and polishing speed, showing their unsuitability as an aqueous dispersion for chemical/mechanical polishing.

On the other hand, in the experiments of Examples 1–16 using the aqueous dispersions for chemical/mechanical polishing of the present invention, both the number of scratches and dishing were excellent, the polishing speed was sufficient, and there have been no problems in antiseptic capability.

As described above, the aqueous dispersion for chemical/mechanical polishing of the present invention is free from the problem of rotting even if stored or used in a neutral pH region and produces an excellent polished surface with almost no dishing or scratches when used particularly in the STI process in the manufacture of semiconductor devices.

What is claimed is:

1. An aqueous dispersion for chemical/mechanical polishing comprising:
   (A) abrasive grains that are ceria particles,
   (B) at least one compound selected from the group consisting of 2-bromo-2-nitro-1,3-propanediol, 2-bromo-2-nitro-1,3-butanediol, 2,2-dibromo-2-nitroethanol, and 2,2-dibromo-3-nitrilopropionamide, and
   (C) an organic component other than the compounds of component (B) where the organic component (C) comprises at least one selected from the group consisting of a potassium salt of polyacrylic acid, an ammonium salt of polyacrylic acid, ammonium citrate and ammonium dodecylbenzenesulfonate.

2. The aqueous dispersion for chemical/mechanical polishing according to claim 1, which is used for a shallow trench isolation process.

3. The aqueous dispersion for chemical/mechanical polishing according to claim 1, wherein the at least one compound (B) comprises 2-bromo-2-nitro-1,3-propanediol.

4. The aqueous dispersion for chemical/mechanical polishing according to claim 1, wherein the at least one compound (B) is selected from the group consisting of 2-bromo-2-nitro-1,3-butanediol, 2,2-dibromo-2-nitroethanol, and 2,2-dibromo-3-nitrilopropionamide.

5. The aqueous dispersion for chemical/mechanical polishing according to claim 1, wherein aqueous dispersion comprises from 0.0002 to 0.2 wt % of the at least one compound (B).

6. The aqueous dispersion for chemical/mechanical polishing according to claim 1, wherein aqueous dispersion comprises from 0.003 to 0.12 wt % of the at least one compound (B).

7. The aqueous dispersion for chemical/mechanical polishing according to claim 1, wherein aqueous dispersion has a pH in a range of from 4–10.

8. The aqueous dispersion for chemical/mechanical polishing according to claim 1, wherein aqueous dispersion has a pH in a range of from 6–9.

9. A method of making a dispersion, the method comprising adding to an aqueous medium
   (A) abrasive grains that are ceria particles,
   (B) at least one compound selected from the group consisting of 2-bromo-2-nitro-1,3-propanediol, 2-bromo-2-nitro-1,3-butanediol, 2,2-dibromo-2-nitroethanol, and 2,2-dibromo-3-nitrilopropionamide, and
   (C) an organic component other than the compounds of component (B), where the organic component (C) comprises at least one selected from the group consisting of a potassium salt of polyacrylic acid, an ammonium salt of polyacrylic acid, ammonium citrate and ammonium dodecylbenzenesulfonate; and
   producing the aqueous dispersion of claim 1.

* * * * *